US008995992B1

(12) United States Patent
Cohen

(10) Patent No.: US 8,995,992 B1
(45) Date of Patent: Mar. 31, 2015

(54) METHOD AND SYSTEM FOR SECURE MOBILE DEVICE NUMBER LOOKUP AND MODIFICATION

(75) Inventor: Jack M. Cohen, New York, NY (US)

(73) Assignee: Cellco Partnership, Basking Ridge, NJ (US)

( * ) Notice: Subject to any disclaimer, the term of this patent is extended or adjusted under 35 U.S.C. 154(b) by 863 days.

(21) Appl. No.: 12/875,581

(22) Filed: Sep. 3, 2010

(51) Int. Cl.
*H04W 24/00* (2009.01)

(52) U.S. Cl.
USPC .......... 455/425; 455/410; 455/411; 455/423; 455/424

(58) Field of Classification Search
USPC ...................................... 702/109; 455/432.3
See application file for complete search history.

(56) References Cited

U.S. PATENT DOCUMENTS

| | | | |
|---|---|---|---|
| 7,299,276 B1 * | 11/2007 | Strawn | 709/224 |
| 7,562,818 B1 * | 7/2009 | Bierbaum et al. | 235/384 |
| 7,565,141 B2 * | 7/2009 | Macaluso | 455/419 |
| 8,036,636 B1 * | 10/2011 | Rieschick et al. | 455/406 |
| 2002/0123336 A1 * | 9/2002 | Kamada | 455/420 |
| 2004/0008669 A1 * | 1/2004 | Bos et al. | 370/352 |
| 2005/0213724 A1 * | 9/2005 | O'Brien et al. | 379/202.01 |
| 2006/0205420 A1 * | 9/2006 | Bibr et al. | 455/466 |
| 2007/0293207 A1 * | 12/2007 | Guedalia et al. | 455/415 |
| 2008/0071629 A1 * | 3/2008 | Benson et al. | 705/26 |
| 2008/0114654 A1 * | 5/2008 | McGrath et al. | 705/14 |
| 2008/0212744 A1 * | 9/2008 | Wurst et al. | 379/27.01 |
| 2008/0281510 A1 * | 11/2008 | Shahine | 701/207 |
| 2009/0037207 A1 * | 2/2009 | Farah | 705/1 |
| 2010/0027431 A1 * | 2/2010 | Morrison et al. | 370/252 |
| 2010/0269149 A1 * | 10/2010 | Lee et al. | 726/1 |

* cited by examiner

*Primary Examiner* — Suhail Khan

(57) ABSTRACT

Method and system for testing communication devices via network connections. A request from a user in association with testing a communication device is received by a server. The request is with respect to a feature of the communication device that is being tested. The request is forwarded to a gateway that is responsible for facilitating the testing of communication devices. Upon receiving a response by the server from the gateway, the response is sent to the user.

25 Claims, 12 Drawing Sheets

METHOD AND SYSTEM FOR SECURE MOBILE DEVICE NUMBER LOOKUP AND MODIFICATION

BACKGROUND

1. Technical Field

The present teaching relates to methods, systems, and programming for telecommunications equipment testing or the like, for example, via network connections.

2. Discussion of Technical Background

With the advancement of telecommunications, the use of handheld devices has becoming increasingly ubiquitous. The industry has gradually shifted from massive production of desktop computers or laptop computers to massive production of a variety of handheld devices such as cellular phones, BlackBerry®, Personal Data Assistance (PDA), iPhone, etc. Traditionally, testing such devices after production is a laborious process and, hence, costly. In addition, due to the rapid development of various applications that handheld devices can support, it is common that new services or applications can be offered to users of existing devices. For example, in order to get such services, a user can take the device to a nearby shop to subscribe for the new service and to test whether new applications will run on an existing device properly. In this case, the personnel at the shop may assist the user to subscribe to the new service and test the device.

Traditionally, as a part of the process of testing applications on a handheld device, it is often necessary for a human tester to view information associated with a device being tested. Such information frequently relates to the features the device has, e.g., whether it has Visual VoiceMail (VVM), the billing system in which a Mobile Directory Number (MDN, i.e., the device's phone number) account information exists, the Mobile Equipment Identifier (MEID, i.e., the device's serial number) to which the MDN was assigned, the Account Number of the MDN, the effective date of the Mobile Telephone Number (MTN), the environments in which the MDN exists (e.g., Production and/or any of various Test environments), etc. To simulate a testing condition, it is also often necessary to make certain changes to some recorded features of a device being tested. For instance, to test whether a handset will properly support remote subscribing for the VVM service via the self-service feature, the VVM feature may need to be removed from the Class of Service (CoS) of an account to simulate a scenario in which a user is subscribing to VVM for the first time.

Due to the fact that there is likely sensitive data in both production and test environments, at least some of the features need to be tested in a secure manner, so that a tester is not allowed to inadvertently make unauthorized changes or update account information of existing customers of a service provider. Examples of information that should not be accessed by personnel performing the testing include the account information such as the incoming/outgoing calls of the device, or the unique identification of the device such as the MDN or MTN of the device. To ensure the security, in a conventional testing environment, either during the production or after service testing, permission to view such secure information and/or to make changes to secure features is typically provided only to a few authorized individuals, often accompanied with well-defined read/write access to such individuals. Given such a configuration, the testing process traditionally involves the following steps:

1. A tester (or the user) manually contacts an authorized individual, requesting either information associated with a device identified using an MDN or a change on a specific feature of the device
2. The authorized individual manually performs the task and then manually sends the response to the request back to the tester
3. The tester continues the rest of the testing based on the response from the authorized individual The process is manual to ensure the security of the information passed to the tester. The manual aspect of the existing testing processes makes the process slow and inefficient. In addition, to ensure confidentiality of the information, it is usually the case that only a few individuals are given the authority to access such information, to filter it for security reasons and, hence, this makes the testing process not only slow and inefficient but also error prone, sometimes leading to substantial delay. Therefore, a simple, automated, and yet secure approach to streamlining a testing process is needed.

SUMMARY

In one example, a method is implemented on a computer having at least one processor, storage, and a communication platform for testing communication devices via network connections. A server receives a request from a user in association with testing a communication device. The server forwards the request to a gateway that is responsible for facilitating the testing of communication devices. When the server receives, from the gateway, a response to the request forwarded, the server sends the response to the user. The request is with respect to a feature of the communication device that is being tested.

The server includes an Internet enabled user interface, connected to a server, configured for receiving a request from a user in association with testing a communication device and for presenting a response to the request to the user. The server also includes a request transmitter configured for forwarding the request to the gateway that is responsible for facilitating the testing of communication devices, and a response receiver configured for receiving, from the gateway, a response to the request forwarded.

In another example, a method is implemented on a computer having at least one processor, storage, and a communication platform for testing communication devices via network connections. A gateway, which is connected to a backbone platform, receives a first request from a server in association with testing a communication device. The gateway analyzes the first request to determine an operation to be performed with respect to a feature of the communication device. The gateway then sends a second request, generated based on the first request, to the backend service platform to perform the operation. When the gateway receives, from the backend service platform, a response to the second request, the gateway processes the response based on the first request and sends the processed response to the server.

The gateway includes a communication port configured for receiving a first request from a server in association with testing a communication device and for returning a response to the server. The gateway also includes a request analyzing mechanism configured for analyzing the first request to determine an operation to be performed with respect to a feature of the communication device and a request forwarding unit configured for sending a second request, generated based on the first request, to the backend service platform to perform the operation. The gateway further comprises a response receiver configured for receiving, from the backend service platform, a response to the second request, and a response processing mechanism configured for processing the response based on the first request.

Other concepts relate to unique software for implementing the method of networked telecommunication device testing. A software product, in accord with this concept, includes at least one machine-readable medium and information carried by the medium. The information carried by the medium may be executable program code data regarding a server/servlet, a gateway, etc. When such information carried by the medium is read by a machine, it causes the machine to perform programmed functions. In one example, a server located in a cluster of one or more servers executes instructions recorded on a medium and is capable of receiving a request to get information related to a specific handheld device being tested. To retrieve information requested from a backend storage, instructions associated with a servlet are executed to connect with a gateway that is provided to facilitate different needs associated with device testing. Based on a valid request from a servlet, a gateway may further execute additional instructions to request a backend storage facility to perform the operation requested by the servlet.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to apparatus and method supporting telecommunication device testing. System configuration and method are disclosed in which a servlet is responsible for forwarding requests/responses associated with device testing and a gateway is responsible for processing requests associated with device testing and generating responses accordingly. The system and method according to the present teaching are to maximize the efficiency in device testing and in the meantime, minimize the errors associated with human operations. Although the present teaching is disclosed herein with examples related to servlets and/or gateways, it is to be understood that the disclosed teaching can be realized based on different types of processing components. In addition, although the illustrations provided herein refer to servlets and gateways separately, such servlet and gateway may be implemented in either corresponding different or the same physical computing equipment. Furthermore, in the context of computing resources, although the discussions herein refer to a specific servlet or gateway, each of such servlet and gateway may be implemented in a centralized or a distributed manner and each may access information which can be centrally stored or distributed across a network. Details of the present teaching are discussed below with respect to FIGS. 2-8.

Figure 1:
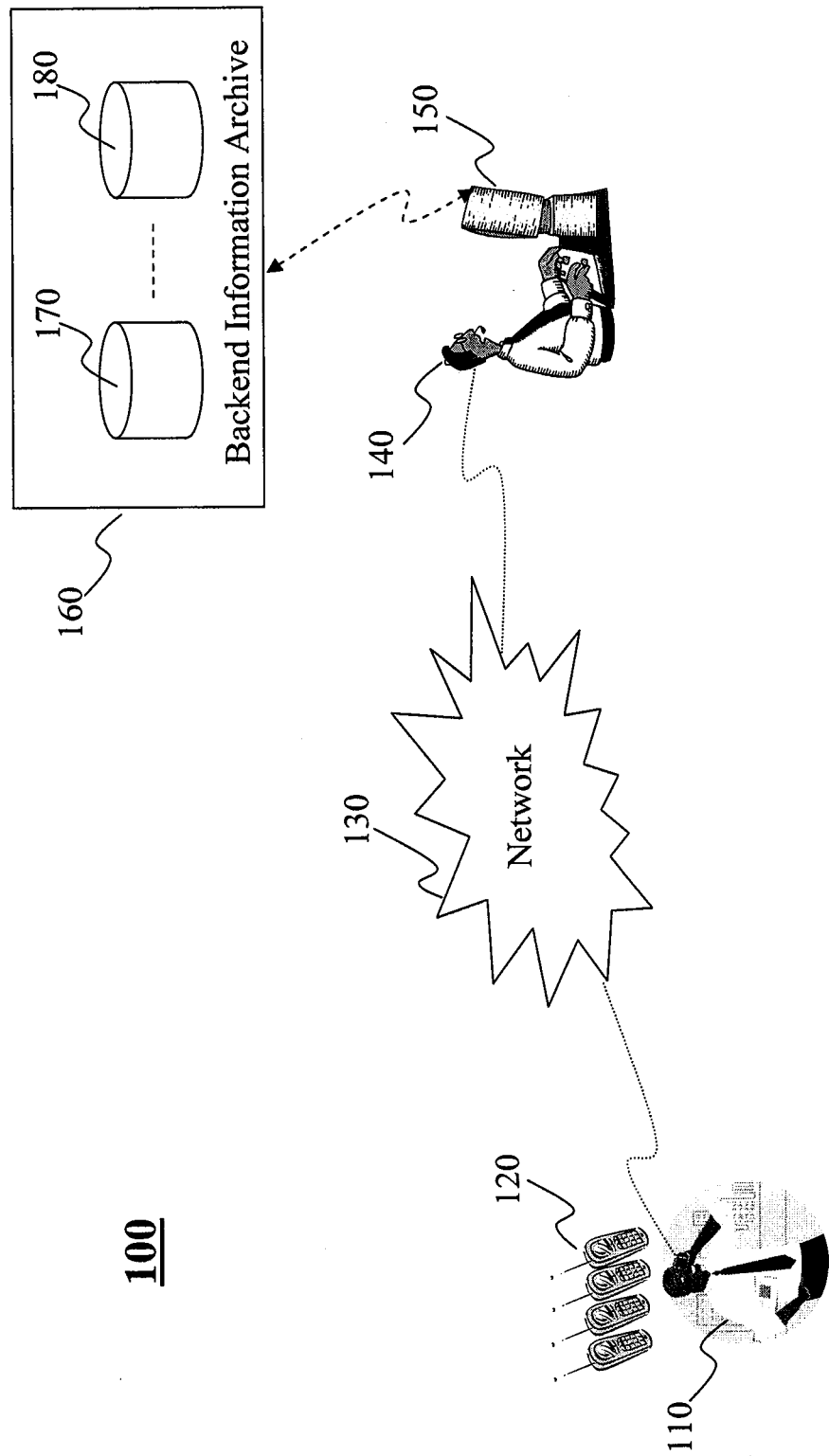
FIG. 1 (Prior Art) shows a conventional system configuration for networked telecommunication device testing.
Figure 2:
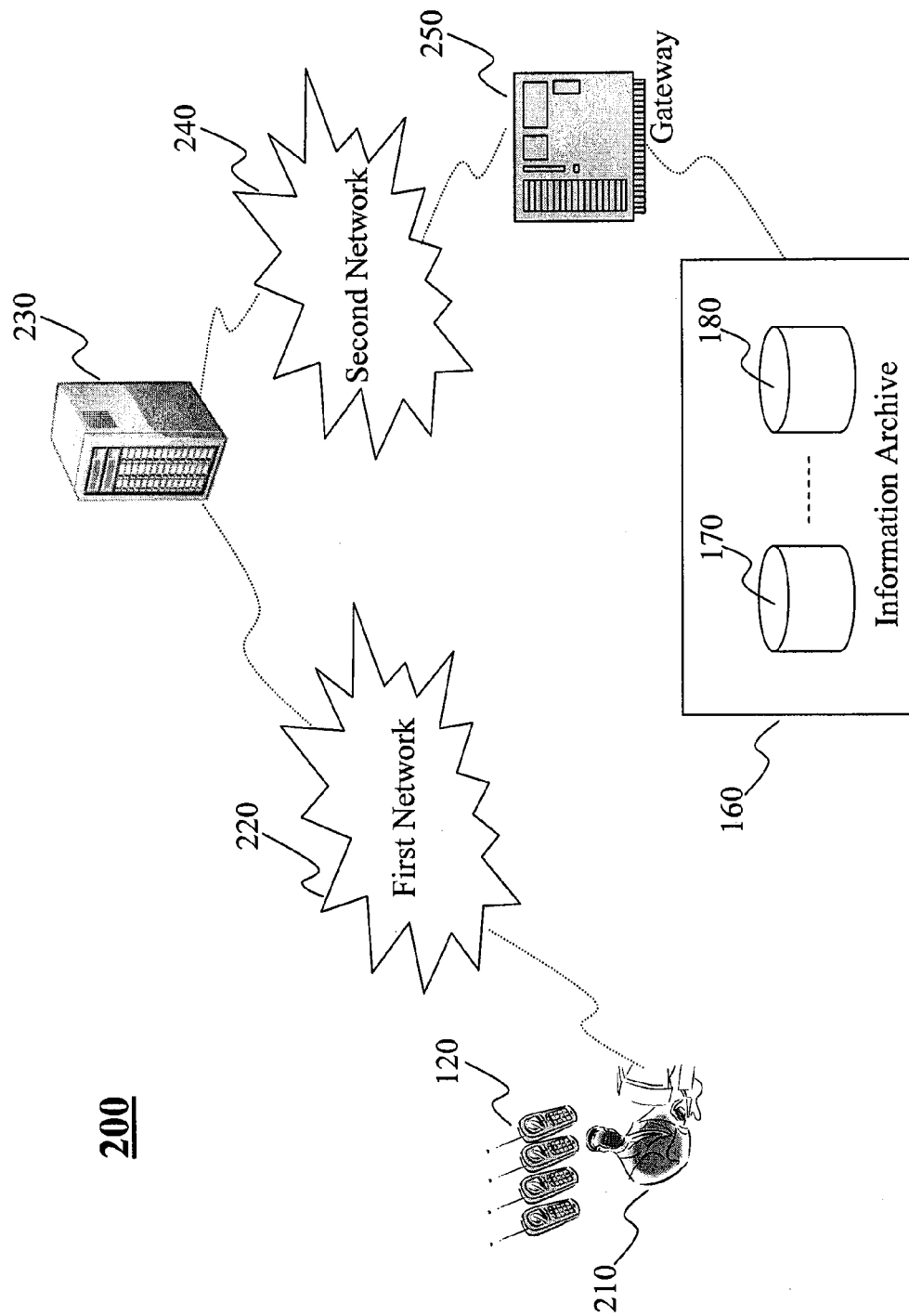
FIG. 2 depicts an exemplary system configuration that supports networked telecommunication device testing, according to an embodiment of the present teaching.

FIG. 2 depicts an exemplary system configuration 200 that supports networked telecommunication device testing, according to an embodiment of the present teaching. The system configuration 200 comprises a tester 210, who is testing telecommunication devices 120, a server 230, connected to the tester 210 via a first network 220, and a gateway 250, which has access to information archive 160 and is connected to the server 230 via a second network 240. The tester 210 may be a human who is responsible for testing individual devices 120 to make sure that, e.g., each of the devices being tested functions in accordance with what it is designed to achieve in an operating environment specified. The telecommunication devices 120 may be any devices that can be used by a user to communicate with others, including a cellular phone, a personal data assistant (PDA), or any type of hand held devices that have the ability to support communications.

Each device to be tested may be associated with different types of information. For instance, each such device may have a manufacturer serial number, a network identifier, a list of functionalities that it supports, a home network operator that the device is manufactured for, or specified default settings, etc. Such device related information may be stored in both the device itself and in the storage for the information archive 160. That is, device related information stored in the device and the information archive database 160 is consistent. In providing services (by the home network operator or its affiliated network operators), such device related information is used in deciding, on-the-fly, how the home network operator may serve the user of the device.

The server 230 connected to the tester 210 is generally a computer system designed to perform certain functions. In the context of the present disclosure, the server 230 is for facilitating the tester 210 in testing telecommunication devices 120. For that purpose, the server 230 may correspond to a servlet residing in a server such as a web server that hosts one or more Internet accessible applications. Such a servlet may be a centralized application but may also be distributed across the network. When it is distributed, each servlet may be responsible for a range of devices determined based on, e.g., geographical regions of the testing center, type of devices to be tested, the testers, etc. Each of such servlets may reside in a cluster of servlets and each cluster (there may be multiple) may have designations such as being responsible for the testing activities in a particular geographical region or regions. In some embodiments, each cluster or each servlet in each cluster may also be used for load balancing or for fault tolerance. That is, although each may have a designated region of support, a servlet or a cluster of servlets may be dynamically scheduled to be responsible for supporting testing activities of another region or regions when it is needed.

The gateway 250 is also generally a computer system that serves as an access point to information stored in the information archive 160. The information archive 160 may further comprise different databases, centralized or distributed, that store different types of information related to, e.g., devices to be tested, devices in services, user subscriptions associated with devices, promotions, user account information, etc. There may be more than one gateway that serves as access points to the information archive in either a centralized manner or in a distributed manner. When more than one gateway is deployed, there may be a variety of ways to assign each gateway to be responsible for certain tasks. In some embodiments, multiple gateways may be distributed geographically so that each serves as an access point for servlet(s) located in geographically compatible regions. In some embodiments, each gateway may be responsible for access to designated specific types of information and may be controlled by some controller (not shown) that may allocate an appropriate gateway to carry out an access based on the nature of the information requested.

Within the exemplary configuration 200, the tester 210 carries out the testing on different devices 120 with the support of the sever 230, the gateway 250, and the information archive 160. To test a particular functionality of a device to be tested, the tester 210 may first send a request to the server 230 to obtain information related to the device to be tested. This may be done through a user interface provided by the server or servlet 230 for testing purposes. Via the user interface, the tester may enter information related to the device to be tested and information related to the tester. When the server 230 receives the request via the user interface, it may authenticate the tester and if confirmed to be an authorized tester, the server 230 may then send the request for information to the gateway 250. Upon receiving the request, the gateway 250 may then proceed to obtain information related to the device to be tested and send it to the server 230. During this operation, the gateway 250 may automatically inspect the information retrieved that is associated with the device to filter any confidential information before transmitting the filtered information to the server 230, which subsequently forwards the filtered information about the device to be tested to the tester 210.

The tester 210, after receiving the information about the device to be tested, may then determine, based on the information received, what to do in order to carry out the test. For instance, before any testing can be performed, certain information stored in the information archive may need to be modified (maybe temporarily) in order for the tester to be able to test the device. The reason is that, in general, the testing may need to be performed in a real world environment. For example, a mobile device usually operates in either a network operated by its home network operator or in an affiliated network whose operator has an agreement with the home network operator to provide service to the device user. To test the operability of the device in an actual operational environment, during the testing, the tester may operate the device with respect to different functions to see whether the device behaves properly. In actual environments, a device is operable with respect to various operational parameters stored in the information archive of its home network operator. Its behavior is controlled by such operational parameters. Therefore, in order for the tester to test different functions of the device, the information archived in the information archive 160 needs to be consistent with the setting in which the test is to be performed.

The environment required for testing may or may not be consistent with the default setting on the device. For example, if a device's default setting is to have a particular feature but the testing environment requires that the device does not have this feature, the tester needs to first remove that subscribed feature stored in the information archive 160 to create an appropriate testing environment before the actual testing. This may be achieved by a request, issued by the tester, to the server 230, which subsequently makes a request to the gateway to perform certain operations to modify the subscribed features, in the information archive 160, that are associated with the device being tested.

As shown in FIG. 2, in system 200, the tester 210 communicates with the server 230 via the first network 220 and the server 230 communicates with the gateway 250 via a second network 240. The first and second network may or may not be the same network, each of which may individually correspond to a local area network (LAN), a wide area network (WAN), a wireless network, a wired network, the Internet, a public switched telephone network (PSTN), a proprietary network, a virtual private network, a public network, or any combination thereof. The connection between the gateway 250 and the information archive 160 may also be through a third network (not shown) which may or may not be a part of either the first or the second network and can be any of the network types discussed above.

Figure 3:
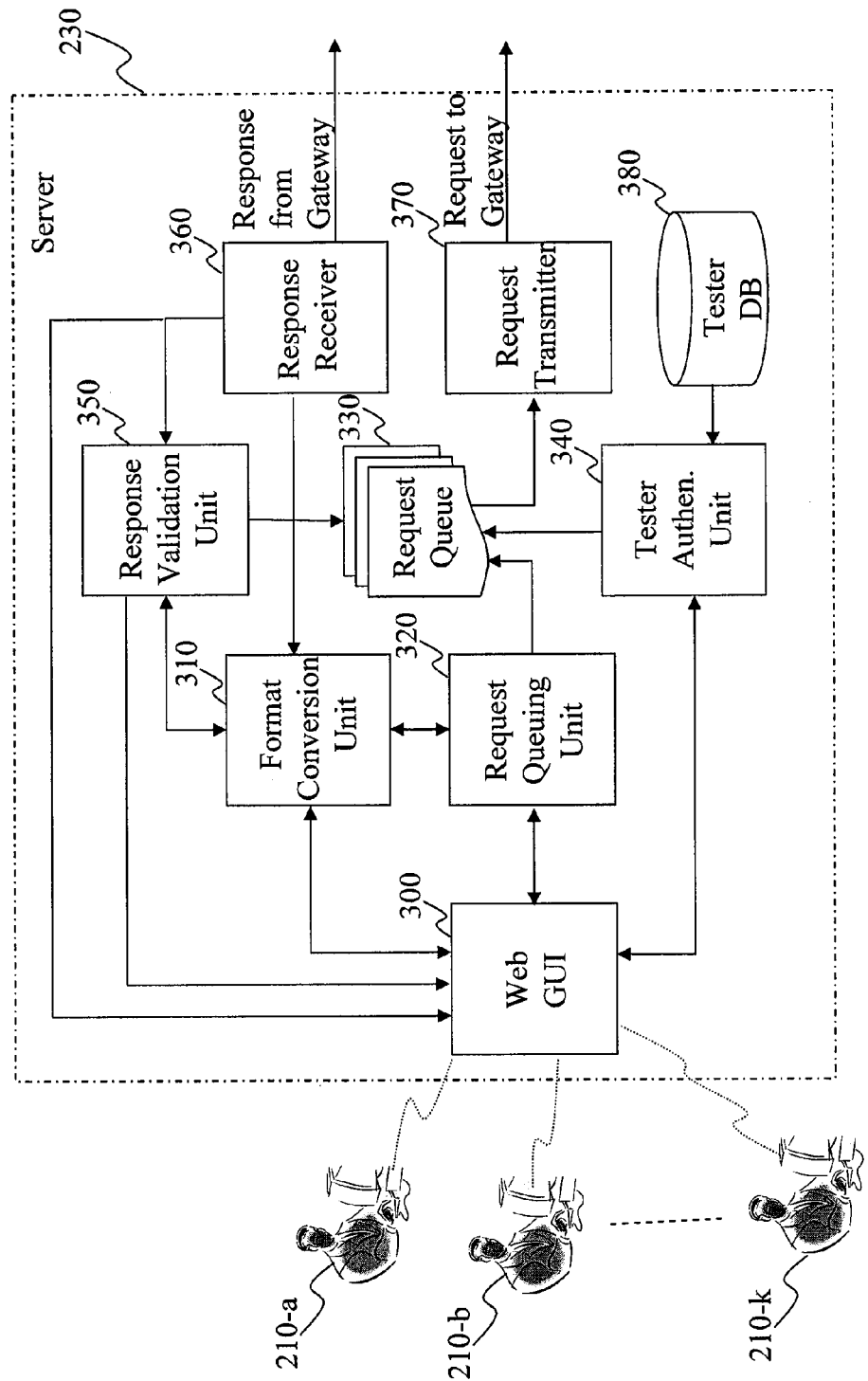
FIG. 3 depicts an exemplary system diagram of a servlet, according to an embodiment of the present teaching.

FIG. 3 depicts an exemplary system diagram of the server 230, according to an embodiment of the present teaching. As discussed earlier, the server 230, in the context of the present teaching, may correspond to a servlet, which may reside on a web server and run as an application thereon. In the illustrated diagram, the servlet 230 comprises a web graphical user interface 300, which is provided to interact with one or more testers 210-a, 210-b, ..., 210-k, a request queuing unit 320, a tester authentication unit 340, a request transmitter 370, a response receiver 360, and a response validation unit 350. Optionally, if needed, a format conversion unit 310 may be deployed when it is needed to convert the information format between the tester and the gateway.

The interaction between the interface 300 and a tester enables the servlet 230 to receive information associated with the testing and request of any operation that the tester desires to perform on the information archived at information archive 160 during the testing. The servlet 230 also interacts with the gateway 250 via the request transmitter 370, which transmits a request from a tester to the gateway 250, and the response receiver 360, which receives a response generated and transmitted by the gateway 250 based on a request received previously.

In operation, when the web GUI 300 receives a request from a tester, it queues the request in a request queue 330. There may be different types of requests. For example, a request may simply ask for information related to a device to be tested. As another example, a request may also ask for an operation to be performed, e.g., removal of a particular feature recorded as being associated with the device being tested. In the context of device testing in accordance with the present teaching, a request may include information describing "who does what to which device". Each request may provide necessary information to complete such description. For example, a request may include an identification of the tester (who), a coded description as to what is requested (does what), identification of the device being tested (to which device), and any additional information, e.g., the confidential information related to the tester for authentication purposes.

The request queuing unit 320 may, upon receiving a request, perform some analysis to ensure that all information necessary to respond to the request has been received. If not, the request queuing unit 320 may direct the web GUI 300 to further interact with a tester to gather the information needed. To process requests from different testers in an appropriate order, each request may then be queued by the request queuing unit 320 in a request queue 330. In some embodiments, such a queue may implement a first come first serve priority. In some embodiments, other data structures, other than a queue, with different priority rules may also be employed. There may be different implementations as to the timing of queuing a request. In some embodiments, upon receiving a request, the request may be queued into the request queue 330. If authentication of a tester is to be performed, a request may be queued first and then removed when the authentication is deemed failed or, alternatively, it may be queued after the authentication is successful.

Upon receiving a request, the servlet 230 may authenticate the tester based on, e.g., information provided with the request and that stored in a tester database 380. In some embodiments, authentication may be applied only when the tester logs on. In some embodiments, authentication may be performed occasionally and in this case, the servlet 230 may periodically request the tester to provide confidential information to ensure authenticity of the testing. In some embodiments, authentication may be performed whenever the confidential information about the tester is supplied to the servlet 230. For example, a tester may work on a computer that locks the screen after a period without any action and requires a password to unlock the screen. In this case, whenever the password is entered, it is sent to the servlet 230 for authentication.

The tester authentication unit 340 may adopt certain control mechanisms. For instance, it may allow some interactions for occasional mistakes but will terminate the process when repeated wrong authentication information is received. In this case, the authentication unit 340 deems that authentication has failed. In this case, it may control the web GUI 300 to terminate the interaction with any user to prevent any further breach.

When the format of the request received from a tester differs from that used by the servlet, a received request is first accessed by the format conversion unit 310 so that the request is converted to a form that can be processed by the servlet and subsequently by the gateway 250. Such transformed request is then stored in the queue 330. Alternatively, a request may be queued in its native format and then be converted into a destination format when it is retrieved and sent to the gateway 250 (not shown) in the transformed format.

A queued request may then be retrieved, in an order in accordance with the implemented system, and transmitted to the gateway by the request transmitter 370. Subsequently, when the gateway 250 sends a response to the servlet 230, the response receiver 360 intercepts the response. Depending on the nature of the request, a response may correspond to information relating to a device being tested, information indicating success or failure in performing a requested operation, or a counter-request for information in order to respond to the initial request. The response received from gateway 250 may be formatted in accordance with a protocol used by the gateway, which may or may not be consistent with that used by the servlet. In the former case, the received response may be forwarded directly to the web GUI 300 and displayed to the tester. In the latter case, the received response may be first converted into a format consistent with that used by the servlet, by the format conversion unit 310, before it is displayed to the tester.

In some embodiments, a response validation unit 350 may be deployed, which, upon being informed of the receipt of a response, may check the response against a corresponding request. If the response is considered satisfactory in terms of responding to what is requested, the request validation unit 350 may remove the queued request so that it is considered successfully processed. In some situations, the response validation unit 350 may invoke the format conversion unit 310 to transform the response to a format so that the response validation unit 350 can analyze the response against the corresponding request. When a response is a counter-request for additional information in order for the gateway 250 to respond to the initial request, the response validation unit 350, upon recognizing the same, may direct the counter-request to the web GUI 300, which may then interact with a tester to gather additional information needed.

Figure 4:
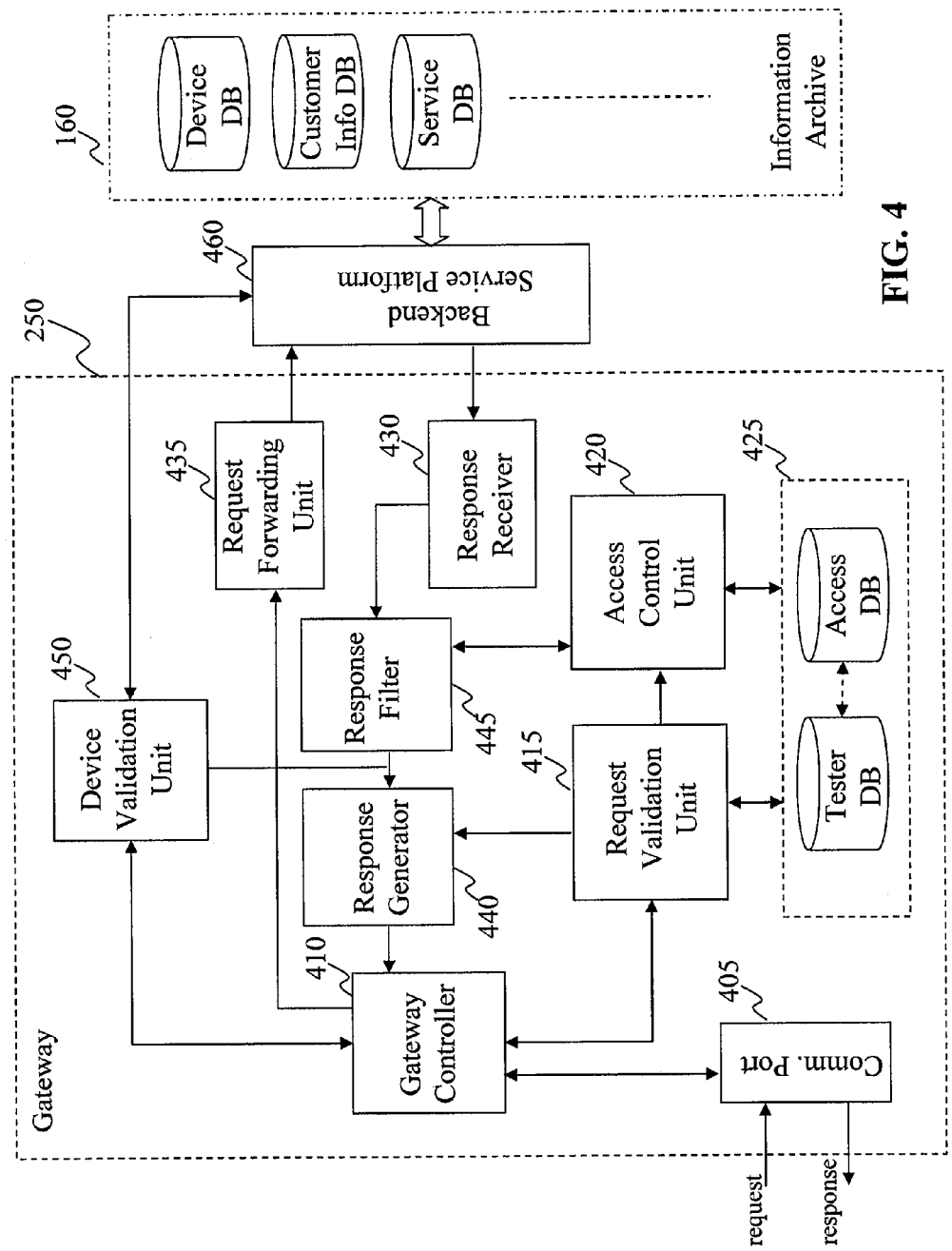
FIG. 4 depicts an exemplary system diagram of a gateway, according to an embodiment of the present teaching.

FIG. 4 depicts an exemplary system diagram of the gateway 250 and its relationship with the information archive 160, according to an embodiment of the present teaching. The gateway 250 comprises a communication port 405 that interfaces with the servlet 230, a gateway controller 410 that controls the operation of the gateway, a request validation unit 415, a device validation unit 450, an access control unit 420, a request forwarding unit 435, a response receiver 430, a response filter 445, and a response generator 440. When the communication port 405 receives a request from the servlet 230, it sends the request to the gateway controller 410, which may then analyze and process the request and invoke different sub-systems to respond to the request.

The device involved in the testing may first be validated by the device validation unit 450. For instance, upon receiving a request to validate a device, the device validation unit 450 may check, with a backend service platform 460 which may have access to information relating to all devices that have been produced, to see whether a device with the provided identifier exists. If the provided identifier for the device does not exist, the device validation unit 450 may inform the response generator 440 so that it will generate an appropriate response. Otherwise, the device validation unit 450 informs the gateway controller 410 to proceed. In that case, the gateway controller 410 may then invoke the request validation unit 415 to verify that what is requested is within the authority of the tester that sends the request. For example, one tester may be assigned to test a portion of a device that requires a temporary modification of the device information stored in the information archive during the testing but is required to recover to the original status after the testing. Another tester may be assigned to test a specific functionality of a device which does not need to modify the information and, therefore, the tester is not allowed to modify the device information in the archive 160. In the former case, if a request is to modify device information stored in the information archive 160, the request falls within the authority of the tester. In the latter case, the request is beyond what is allowed so that the request may be denied.

Such authorization information may be pre-configured and stored in a tester database in a storage 425. Such authorization information may be dynamically modified by an authorized person (not shown) so that the tester database stores the most recent authorization information. After checking the authorization with respect to a tester and a request from the tester, the request validation unit 415 sends the validation result to the response generator 440 so that an appropriate response can be generated. Alternatively, the request validation unit 415 may also send such result to the gateway controller 410 so that the gateway controller may then determine whether to call the response generator 440 to produce an appropriate response. In some embodiments, the gateway controller 410 may produce a response by itself in some situations and may invoke the response generator 440 to form a response in other situations.

In addition to validating a request, the operation/information requested by a tester may also be evaluated, by the access control unit 420 against, e.g., the access rights assigned to the underlying tester. Information specifying the access rights of individual testers may be configured by authorized personnel and stored in an access database in storage 425. For instance, although a tester may be allowed to make a modification request to change device information stored in the information archive 160 (so that such a request will pass the validation by the request validation unit 415), there may be certain information that the tester can only view but not change. If this is the case, a request made by this tester to modify, e.g., a device identifier, may be denied because the device identifier may be a piece of information that can only be viewed but not modified (e.g., it is configured so that no one can modify a device's identifier stored in the device DB in the archive 160). Furthermore, there may be some information associated with devices that can not be viewed by any tester (e.g., a record of the incoming/outgoing calls associated with a device). In this case, the access control unit 420 may pass that restriction information to the response filter so that such information may be filtered from a response. If multiple pieces of information are requested, the access control unit 420 may provide the response filter 445 with specified access restrictions with respect to each piece of requested information.

If the device and request validation units 450 and 415 determine that both the device and the request are within the authorized testing scope, the gateway controller 410 invokes the request forwarding unit 435 to interface with the backend service platform 460 to, e.g., forward the request to the backend service platform 460. The backend service platform 460 then performs what is requested and sends the result to the gateway 250, or specifically the response receiver 430, a response to the request. Since a request may be either for information only or for performing some operation on some information stored in the information archive 160, the response differs in its content. For a request for information, the response may include different types of information associated with a device. When such information is returned to the gateway 250, some of the returned information may be filtered out based on the access rights of the tester before it is forwarded to the tester. For a request for performing an operation on the archived device information, the backend service platform 460 then performs the requested operation and the response to be sent to gateway 250 may be an indication of the success/failure of the operation.

When the response receiver 430 receives a response from the backend service platform 460, it forwards the response to the response filter 445, which may then apply the access restrictions on the received response and produce a filtered response and send it to the response generator 440. The response generator 440 may perform different operations on the filtered response to generate a response, which is subsequently sent to the servlet 230.

Figure 5:
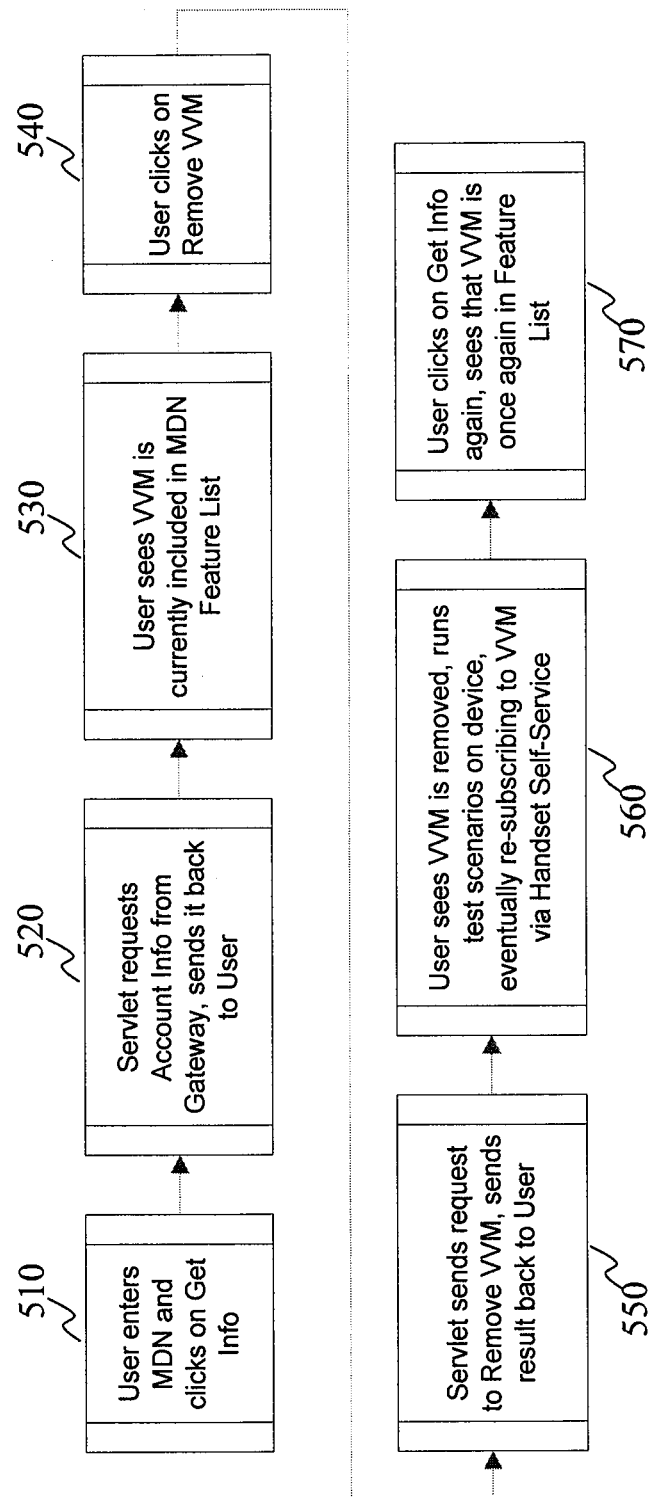
FIG. 5 is an exemplary overall work flow in which a telecommunication device is tested, according to an embodiment of the present teaching.

FIG. 5 is an exemplary work flow in which a tester interacts with a servlet in performing a test for the device function to a subscribing VVM via a handset self-service feature, according to an embodiment of the present teaching. At 510, a tester (or a user of the system) enters, e.g., through a user interface, an MDN and makes a request for information associated with the MDN. At 520, when such request is received, e.g., by the servlet 230, the request is forwarded to the gateway 250 and when the requested information is received from the gateway 250, the servlet sends it back to the user. At 530, the tester observes that a feature list is associated with the device being tested and then, at 540, makes a request to remove a particular feature on the list, e.g., the VVM feature, from the feature list stored in the information archive 160.

When the servlet 230 receives the request to remove the VVM feature, the servlet 230 requests the gateway 250 to perform the removal operation and sends a result back to the tester at 550. Such a result may be an indication of the status of the removal operation. When the tester is notified that the removal operation is successful, i.e., the VVM feature has been removed from the information archive 160, the tester runs a test on the device by subscribing to the VVM feature via the handset self-service (the test itself) at 560. After subscribing to the VVM feature via the device, the tester sends another request to get the feature list for the device from the information archive 160. This can be done by entering the MDN of the device and making a request to get the feature list for the device stored in the information archive 160. If the test is successful, the tester should see, at 570, that the returned feature list includes the feature VVM. Otherwise, the device is not capable of subscribing for a feature in a handset self-service mode.

Figure 6A:
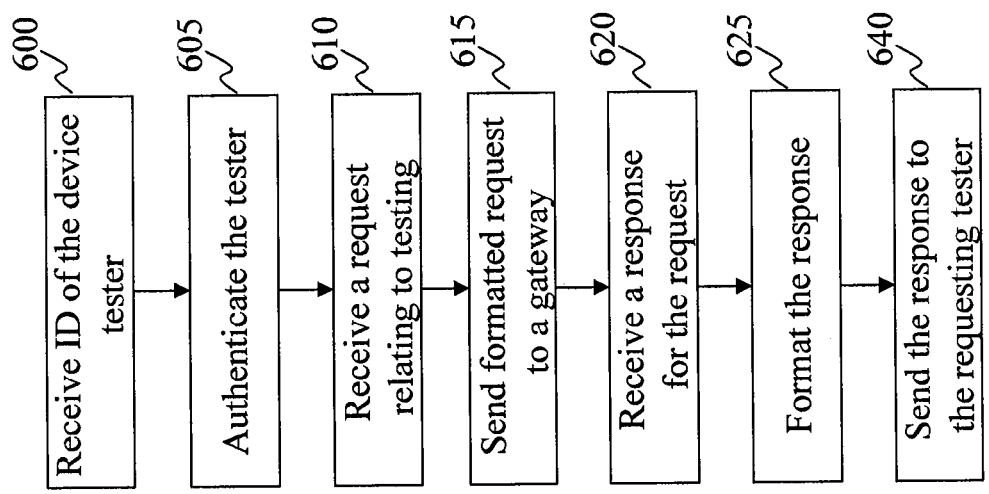
FIG. 6(a) is a flowchart of an exemplary process in which a servlet supports telecommunication device testing, according to an embodiment of the present teaching.
Figure 6B:
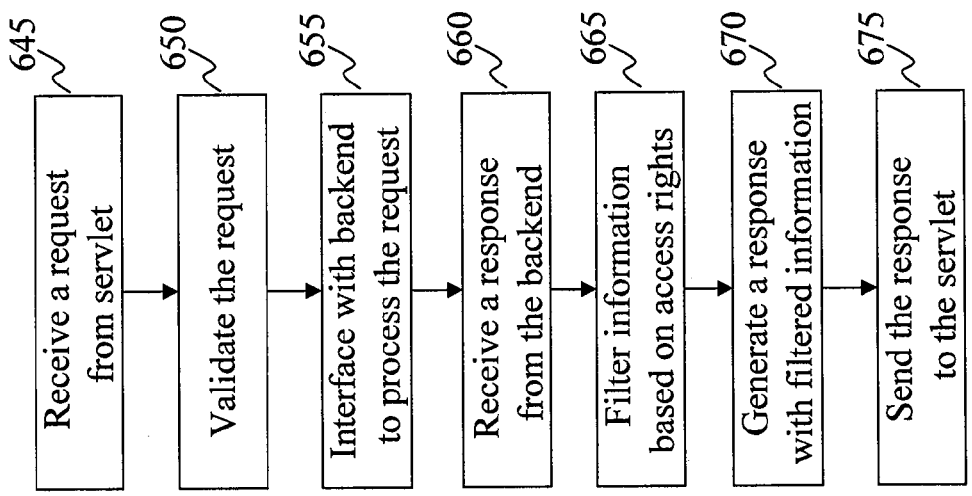
FIG. 6(b) is a flowchart of an exemplary process in which a gateway supports telecommunication device testing, according to an embodiment of the present teaching.

FIG. 6(*a*) is a flowchart of an exemplary process in which the servlet 230 operates to support telecommunication device testing, according to an embodiment of the present teaching. The identification of a tester who is testing a device is first received at 600. The tester is then authenticated at 605. After the tester is authenticated, a request is received, at 610, from the authorized tester. The servlet 230 then formats the request and sends, at 615, the formatted request to the gateway 250. When the servlet receives, at 620, a response from the gateway 250, the servlet 230 formats, at 625, the response and sends, at 640, the formatted response to the requesting tester. Examples of a request include a request for information, a request to remove a feature from the information archive, or a request to add a feature to the information archive.

FIG. 6(*b*) is a flowchart of an exemplary process in which the gateway 250 operates to support telecommunication device testing, according to an embodiment of the present teaching. At 645, a request related to device testing is received from the servlet 230. The request is validated at 650 by the gateway 250. After the request is validated, the gateway 250 interfaces with, at 655, the backend service platform 460 to process the request. When a response is received, at 660, from the backend service platform 460, the gateway 250 filters, at 665, the response based on the access rights associated with the tester to generate, at 670, a response based on the filtered information. The gateway 250 then sends, at 675, the response to the servlet 230.

Figure 7A:
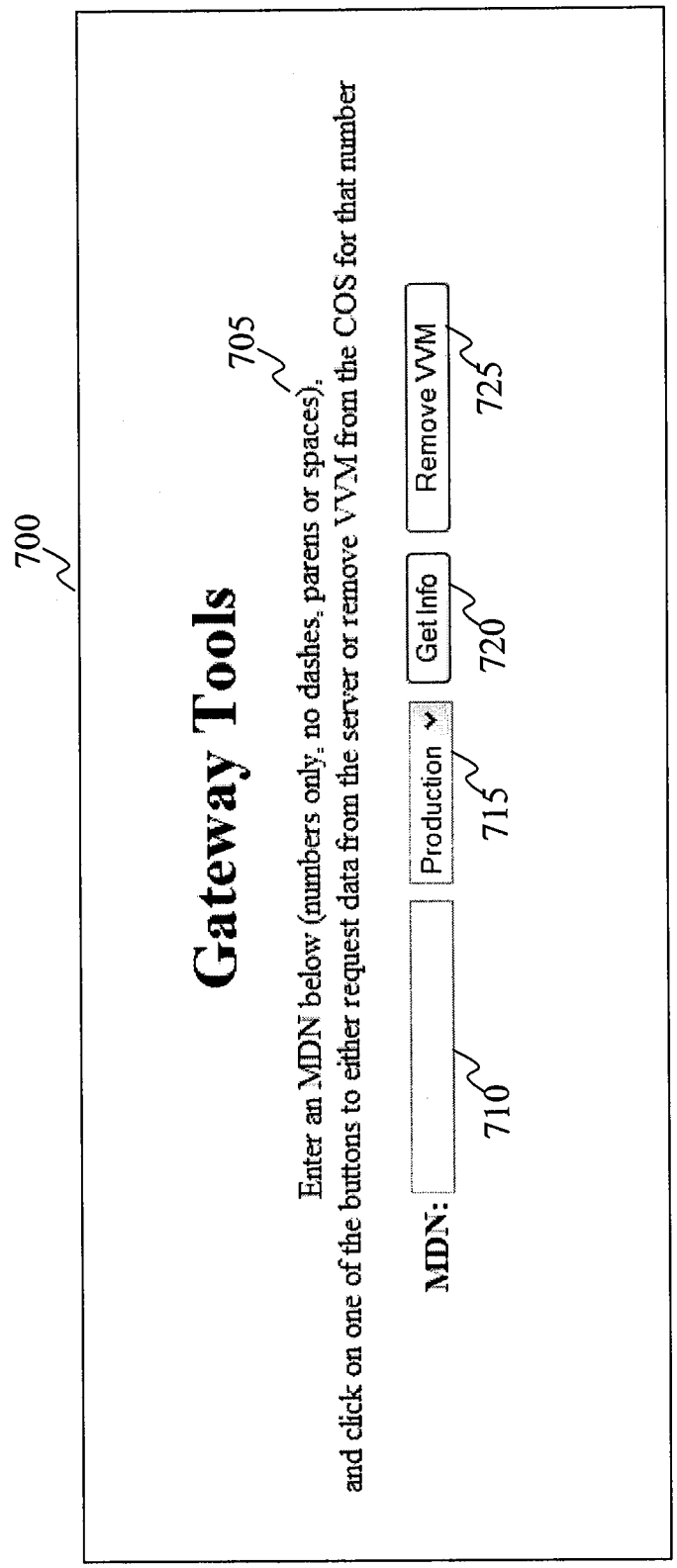
FIGS. 7(a)-7(c) show exemplary user interfaces for telecommunication device testing, according to an embodiment of the present teaching.
Figure 7B:
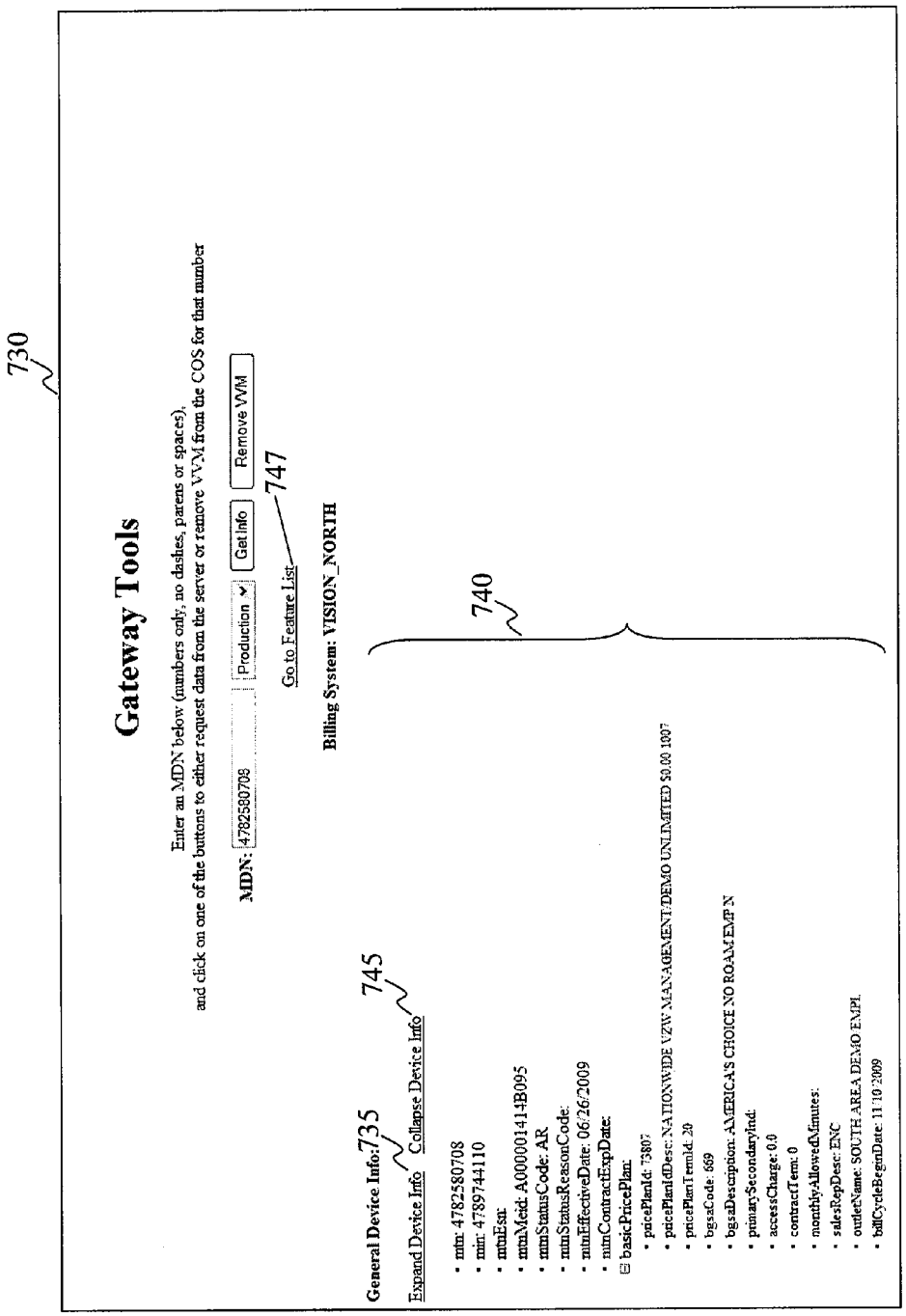
Figure 7C:
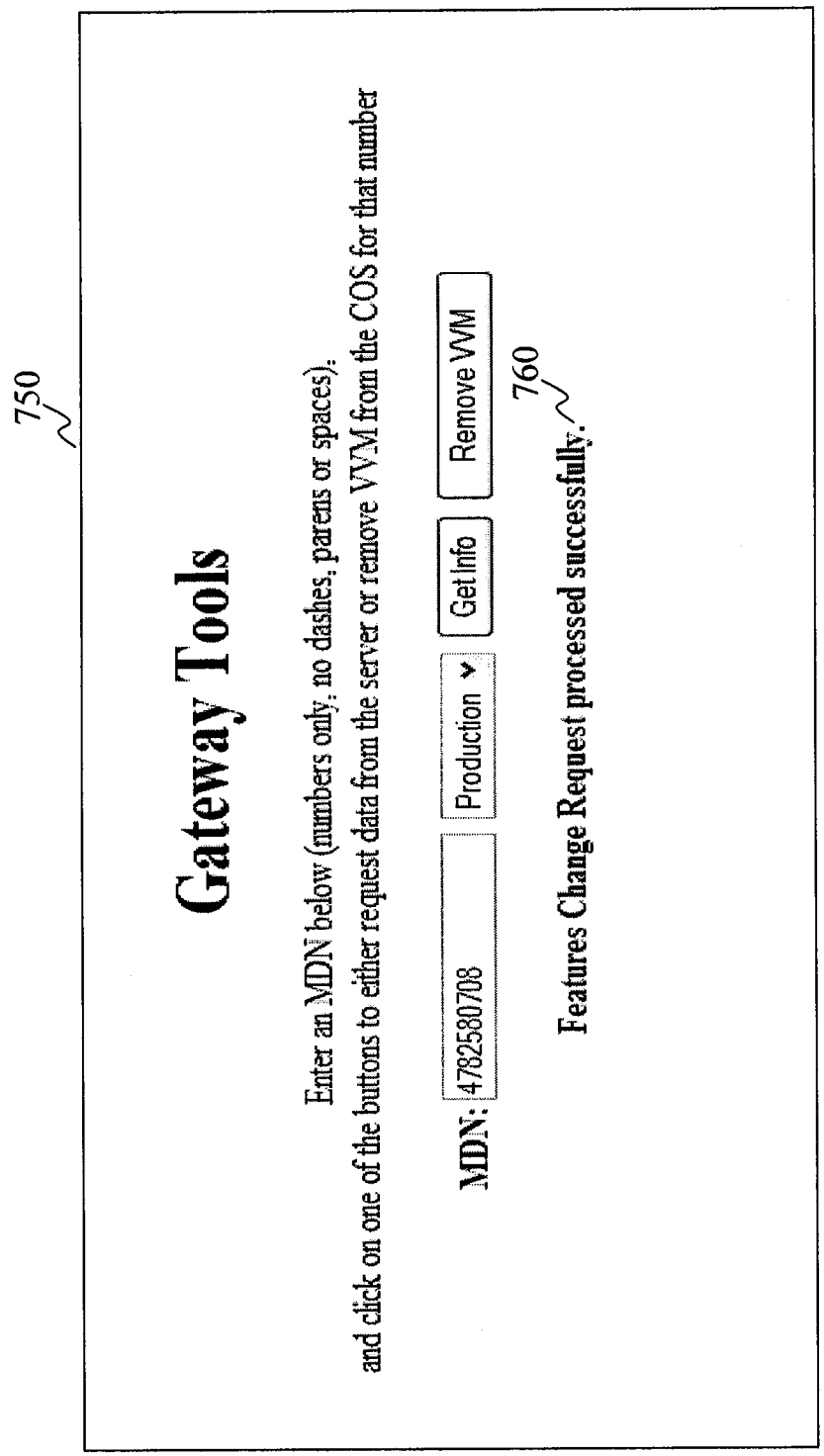

FIGS. 7(*a*)-7(*c*) show exemplary user interfaces for a testing scenario in which device information can be gathered or modified, according to an embodiment of the present teaching. A graphical user interface GUI 700 is shown in FIG. 7(*a*) for gateway tools. In this exemplary interface, it comprises a dialog box 710 for a tester to enter an MDN, a pull-down menu 715 for a tester to select production information associated with a device being tested, a button 720 for activating the function to get archived information related to a device being tested, and another button 725 for activating the function of removing the VVM feature. With the GUI 700, a user can enter an MDN and select production information associated with the device represented by the MDN. The tester may then request, via a function button, the gateway 250 (via servlet 230) to perform a desired function.

If a tester selects the button 720, a request for information or a feature list related to the MDN device is received by the servlet 230 and then forwarded to the gateway 250. As a response to the request to gather information, the gateway 250 returns a list of features, shown as 740, associated with the MDN device. The returned result may also include additional selectable links, such as 735, 745, and 747, for different options in viewing the information associated with the MDN. If the tester selects the button 725 to remove the VVM feature from the feature list, the request is processed and the gateway 250 responds in terms of the status of the requested operation. One exemplary response interface 750 is shown in FIG. 7(*c*), with an indication at 760 that the operation is successful.

Figure 8:
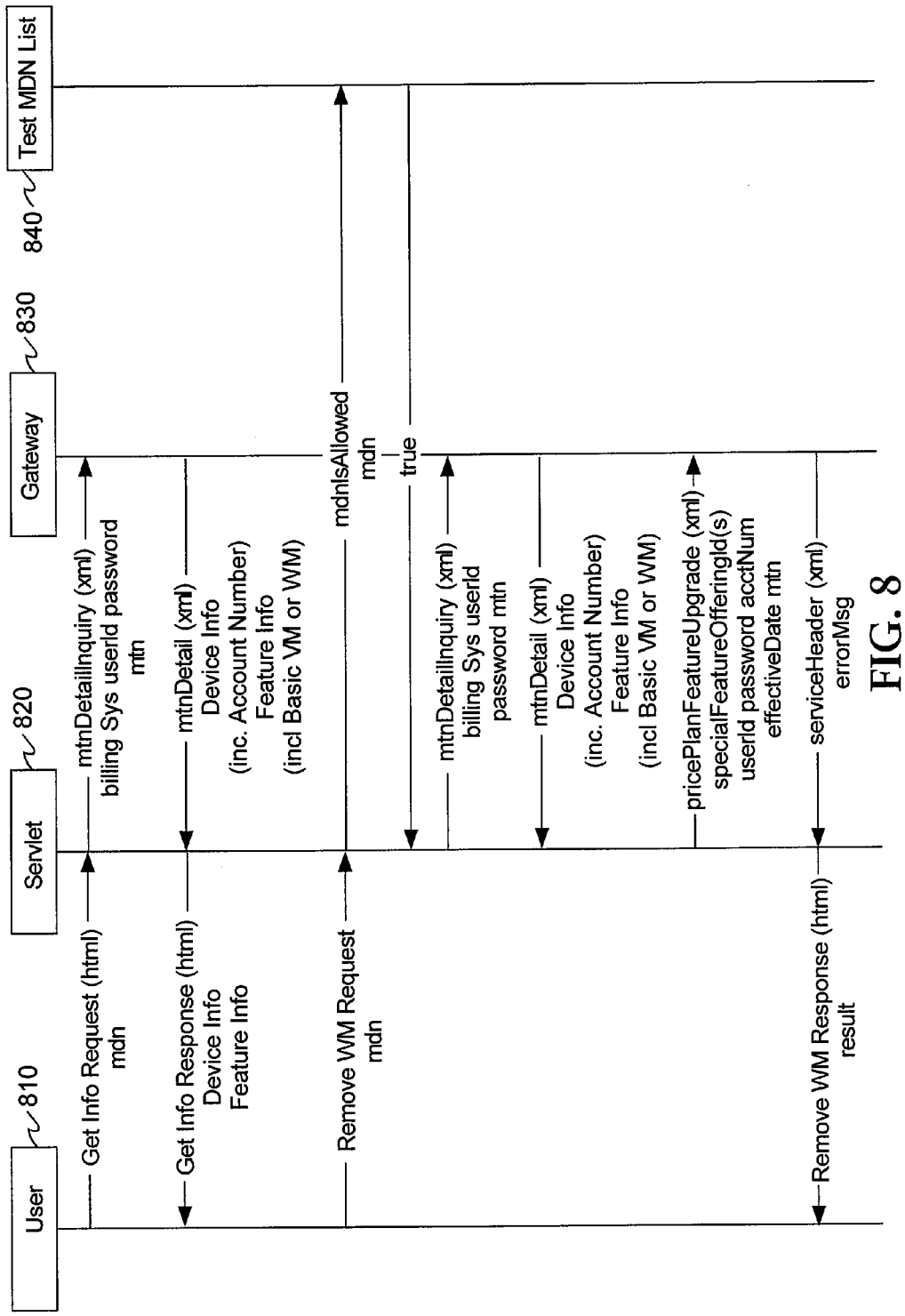
FIG. 8 shows an exemplary communication protocol used by different parts of a telecommunication device testing configuration, in accordance with an embodiment of the present teaching.

FIG. 8 shows an exemplary communication protocol flow used by different parties involved in testing a telecommunication device, in accordance with an embodiment of the present teaching. In this exemplary flow, there are four parties involved, the tester 810, the servlet 820, the gateway 830, and the backend service platform 460 that maintains the feature lists 840 for devices. The protocol shown in FIG. 8 is exemplary and self-explanatory. It is understood that any other communication protocol can be used for the same purpose.

Computer hardware platforms may be used as the hardware platform(s) for one or more of the elements (e.g., the servlet 230, the gateway 250, the backend service platform 460, or the information archive 160) of the testing environment as disclosed herein. A network or host computer platform may typically be used to implement a server. The hardware elements, operating systems and programming languages of such computers are conventional in nature, and it is presumed that those skilled in the art are adequately familiar therewith. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 9:
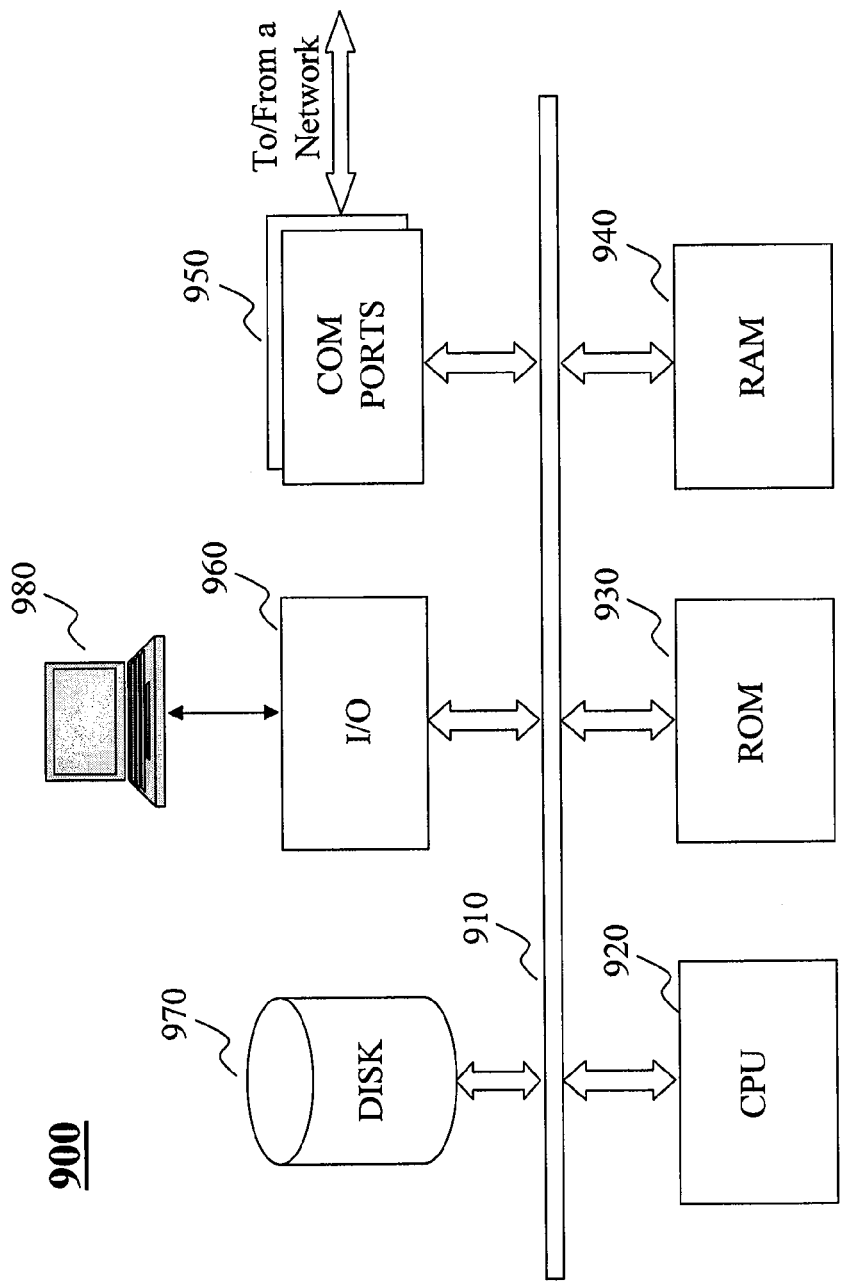
FIG. 9 depicts a general computer architecture on which the present teaching can be implemented.

FIG. 9 provides functional block diagram illustrations of computer hardware platforms with user interface elements. This computer 900 with hardware platforms and user interface elements can be a general purpose computer or a special purpose computer. The computer 900 can be used to implement a servlet or a gateway and their associated components related to supporting telecommunication device testing and their corresponding functionalities as discussed herein. The computer 900, for example, includes COM ports 950 connected to and from a network to facilitate data communication. The computer 900 also includes a central processing unit (CPU) 920, in the form of one or more processors, for executing program instructions. The server platform typically includes an internal communication bus 910, program storage and data storage of different forms, e.g., disk 970, read only memory (ROM) 930, and random access memory (RAM) 940, for various data files to be processed and/or communicated by the server, as well as possibly program instructions to be executed by the CPU. The computer 900 also includes an I/O component 960, supporting input/output flows between the server and user interface elements 980. In some embodiments, the computer 900 may also receive programming and data via network communications.

The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. Hence, aspects of the methods of receiving messages or sending requests through a common communication port in a server or network device from a variety of client applications, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory of the computers, processors or the like, or associated modules thereof, such as various semiconductor memories, tape drives, disk drives and the like, which may provide storage at any time for the software programming.

All or portions of the software may at times be communicated through the Internet or various other telecommunication networks. Such communications, for example, may enable loading of the software from one computer or processor into another, for example, from a management server or host computer of the network operator or carrier into the platform of the message server or other device implementing a message server or similar functionality. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as a main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, the servlet implementation described above can be embodied in a hardware device, or as a software only solution—e.g., requiring installation on an existing server. In addition, a servlet as disclosed herein can also be implemented as a firmware, firmware/software combination, firmware/hardware combination, or hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on a computer having at least one processor, storage, and a communication platform for testing a communication device via network connections, comprising the steps of:
 receiving, by a server, a mobile device number (MDN) of the communication device that is being tested;
 authenticating, by the server, a user, based on identification information of the user provided to the server and authentication data local to the server;
 upon authenticating the user, receiving, by the server, a request, that includes at least a removal request of a subscribed feature related to the MDN, in association with testing the communication device;
 forwarding the request to a gateway that is responsible for facilitating the testing of communication devices;
 receiving, from the gateway, a response to the forwarded request;
 sending the response to the user,
 receiving a further request from the user related to re-subscription of the removed feature;
 forwarding the further request to the gateway;
 receiving, from the gateway, a further response to the forwarded further request; and
 sending the further response to the user.

2. The method of claim 1, wherein the step of forwarding the request comprises the steps of:
 performing analysis on the request; and
 sending the processed request to the gateway.

3. The method of claim 2, wherein the step of performing analysis comprises at least one of the steps:
 formatting the request; and
 queuing the request.

4. The method of claim 1, wherein the step of receiving the response comprises at least one of the steps:
 validating the received response; and
 formatting the response.

5. The method of claim 1 further comprising
 receiving a preliminary request for
 a feature list of the communication device, prior to receiving the removal request
 wherein the subscribed feature related to the MDN is included in the feature list of the communication device.

6. The method of claim 1, wherein the gateway is in communication with a backend service platform linked to an archive recording information related to communication devices.

7. A method implemented on a computer having at least one processor, storage, and a communication platform for testing a communication device via network connections, comprising the steps of:
 receiving a first request from a user, by a gateway connected to a backend service platform, the first request being from a server and including a request to remove a subscribed feature related to a mobile device number (MDN) of the communication device in association with testing the communication device;
 analyzing the first request to determine an operation related to the removal of the subscribed feature to be performed;
 verifying that the operation is authorized for the requesting user;
 sending a second request, generated based on the first request, by the gateway, to the backend service platform to perform the operation;
 receiving, from the backend service platform, a response to the second request;
 processing the response based on the second request;
 sending the processed response to the server;
 receiving a third request from the user via the gateway related to re-subscription of the removed feature;
 analyzing the third request to determine a further operation related to the re-subscription of the subscribed feature;
 sending a fourth request, generated based on the third request, by the gateway, to the backend service platform;
 receiving, from the backend service platform, a further response to the fourth request;
 processing the further response based on the fourth request; and
 sending the processed further response to the server.

8. The method of claim 7, wherein the step of analyzing comprises at least one of the steps:
 determining the operation in connection with the first request;
 validating the communication device in connection with the first request; and
 determining access control information with respect to the user.

9. The method of claim 7, wherein the second request is generated based on a result of the analyzing the first request.

10. The method of claim 7, wherein the step of processing the response, received from the back end service platform, comprises at least one of the steps of:
 filtering the response based on access control defined with respect to a user and the operation;
 selecting one or more individually selectable tools related to the response; and
 formatting the response with respect to the operation and/or incorporating the one or more individually selectable tools.

11. A system for facilitating communication device testing via network connections, comprising:
 an Internet enabled user interface, connected to a server, configured for receiving a request from a user in association with testing a communication device and for presenting a response to the request to the user and for further receiving a mobile device number (MDN) of the communication device that is being tested;
an authentication unit, local to the server, configured for authenticating a user of the communication device, based on identification information provided by the user communicating with the server,
a request transmitter configured for forwarding the request that further includes a removal request of a subscribed feature related to the MDN, to a gateway that is responsible for facilitating the testing of the communication devices, when the user is authenticated;
a response receiver configured for receiving, from the gateway, a response to the forwarded request,
wherein:
the user interface is further configured for receiving a further request from the user related to re-subscription of the removed feature;
the request transmitter is further configured for forwarding the further request to the gateway; and
the response receiver is further configured for receiving, from the gateway, a further response to the forwarded further request.

12. The system of claim 11, further comprising:
a format conversion unit configured for formatting the requests and the responses; and
a request queuing unit configured for queuing the requests in a request queue.

13. The system of claim 11, further comprising a response validation unit configured for validating the received response.

14. The system of claim 11, wherein the user interface is further configured for receiving a preliminary request for
a feature list of the communication device prior to receiving the request for testing the communication device;
wherein the subscribed feature related to the MDN is included in the feature list of the communication device.

15. The system of claim 11, wherein the gateway is in communication with a backend service platform linked to an archive recording information related to communication devices.

16. A system for facilitating communication device testing via network connections, comprising:
a communication port configured for receiving a first request from a server, the first request including a request to remove a subscribed feature related to a mobile device number (MDN) of the communication device, and associated with testing the communication device and for returning a response to the server, wherein the first request is received from a user;
a request analyzing mechanism configured for analyzing the first request to determine an operation to be performed related to the removal of the subscribed feature;
a request validation unit configured for verifying that the requested operation is authorized for the user;
a request forwarding unit configured for sending a second request, generated based on the first request, to a backend service platform to perform the operation;
a response receiver configured for receiving, from the backend service platform, a response to the second request; and
a response processing mechanism configured for processing the response based on the second request;
wherein:
the communications port is further configured to receive a third request related to re-subscription of the removed feature;
the request analyzing mechanism is further configured to determine a further operation related to the re-subscription of the subscribed feature;
the request forwarding unit is configured to send a fourth request, generated based on the third request to the backend service platform;
the response receiver is configured to receive from the backend service platform, a further response to the fourth request; and
the response processing mechanism is configured for processing the further response based on the fourth request.

17. The system of claim 16, wherein the request analyzing mechanism comprises at least one of:
a gateway controller configured for determining the operation in connection with the first request;
a device validation unit configured for validating the communication device in connection with the first request; and
an access control unit configured for determining access control information with respect to the user.

18. The system of claim 16, wherein the response processing mechanism comprises at least one of:
a response filter configured for filtering the response based on access control defined with respect to a user and the operation;
a response generator configured for:
selecting one or more individually selectable tools related to the response, and
formatting the response with respect to the operation and/or incorporating the one or more individually selectable tools.

19. A non-transitory machine readable medium having information recorded thereon for facilitating communication device testing via network connections, wherein the information, when read by the machine, causes the machine to:
receive, by a server, a mobile device number (MDN) of the communication device that is being tested;
authenticate, by the server, a user of the communication device, based on identification information of the user provided to the server and authentication data local to the server;
upon authenticating the user, receive, by a server, a request, that includes at least a removal request of a subscribed feature related to the MDN, associated with testing the communication device;
forward the request to a gateway that is responsible for facilitating the testing of communication devices;
receive, from the gateway, a response to the forwarded request; and
send the response to the user,
receive a further request from the user related to re-subscription of the removed feature;
forward the further request to the gateway;
receive, from the gateway, a further response to the forwarded further request; and
send the further response to the user.

20. The medium of claim 19, wherein the information that causes the machine to forward the request to the gateway further causes the machine to:
perform analysis on the request; and
send the processed request to the gateway.

21. The medium of claim 20, wherein the information that causes the machine to perform the analysis causes the machine to perform at least one of the steps of:
formatting the request; and
queuing the request.

22. The medium of claim 19, wherein information that causes the machine to receive the response causes the machine to perform at least one of the steps of:
- validating the received response received; and
- formatting the response.

23. A non-transitory machine readable medium having information recorded thereon for facilitating communication device testing via network connections, wherein the information, when read by the machine, causes the machine to:
- receive, a first request from a user, by a gateway connected to a backend service platform, the first request being from a server, the first request includes at least a removal request of a subscribed feature related to a mobile device number (MDN) of the communication device and associated with testing the communication device;
- analyze the first request to determine an operation related to the removal of the subscribed feature to be performed;
- verify that the operation to be performed is authorized for the requesting user;
- send a second request, generated based on the first request, by the gateway, to the backend service platform to perform the operation;
- receive, from the backend service platform, a response to the second request;
- process the response based on the second request; and
- send the processed response to the server;
- receive a third request from the user via the gateway related to re-subscription of the removed feature;
- analyze the third request to determine a further operation related to the re-subscription of the subscribed feature;
- send a fourth request, generated based on the third request, by the gateway, to the backend service platform;
- receive, from the backend service platform, a further response to the fourth request;
- process the further response based on the fourth request; and
- send the processed further response to the server.

24. The medium of claim 23, wherein the information that causes the machine to analyze the first request causes the machine to:
- determine the operation in connection with the first request;
- validate the communication device in connection with the first request; and
- determine access control information with respect to the user.

25. The medium of claim 23, wherein the information that causes the machine to process the response based on the second request causes the machine to:
- filter the response based on access control defined with respect to a user and the operation;
- select one or more individually selectable tools related to the response; and
- format the response with respect to the operation and/or incorporating the one or more individually selectable tools.

* * * * *